United States Patent [19]

Frank et al.

[11] Patent Number: 4,865,919
[45] Date of Patent: Sep. 12, 1989

[54] METHOD OF FABRICATING A CURVED GLASS PANEL HAVING A REMOVABLE SECTION AND GLASS PANEL WITH A REMOVABLE SECTION

[75] Inventors: Robert G. Frank, Sarver; Kathleen L. Moyer, Allison Park, both of Pa.

[73] Assignee: PPG Industries, Inc., Pittsburgh, Pa.

[21] Appl. No.: 253,310

[22] Filed: Sep. 30, 1988

Related U.S. Application Data

[63] Continuation of Ser. No. 173,383, Mar. 25, 1988, abandoned, which is a continuation-in-part of Ser. No. 225, Jan. 2, 1987, abandoned.

[51] Int. Cl.$^4$ ................... C03B 23/023; C03B 33/02
[52] U.S. Cl. ........................... 428/410; 65/104; 65/105; 65/112; 65/113; 428/33; 428/67
[58] Field of Search ............... 65/104, 106, 105, 112, 65/113; 428/33, 67, 410

[56] References Cited

U.S. PATENT DOCUMENTS

| | | | |
|---|---|---|---|
| 2,378,091 | 6/1945 | McCormick, Jr. | 65/112 |
| 3,287,200 | 11/1966 | Hess et al. | 161/1 |
| 3,301,650 | 1/1967 | Ward | 65/95 |
| 3,357,876 | 12/1967 | Rinehart | 161/1 |
| 3,453,161 | 7/1969 | Golightly | 156/102 |
| 3,537,345 | 11/1970 | Luppino | 83/12 |
| 3,573,022 | 3/1971 | Frank | 65/104 |
| 3,695,497 | 10/1972 | Dear | 225/2 |
| 3,710,516 | 1/1973 | Kelly | 51/283 |
| 3,721,594 | 3/1973 | Tarnopol et al. | 156/89 |
| 3,792,989 | 2/1974 | Dahlberg et al. | 65/112 |
| 3,795,572 | 3/1974 | Torre | 65/112 |
| 3,880,636 | 4/1975 | Tobin et al. | 65/107 |
| 3,900,673 | 8/1975 | Mattimoe et al. | 428/339 |
| 3,930,825 | 1/1976 | Chui | 65/105 |
| 3,992,181 | 11/1976 | Frank | 65/104 |
| 4,046,951 | 9/1977 | Stefanik | 428/412 |
| 4,052,188 | 10/1977 | Seymour | 65/273 |
| 4,053,679 | 10/1977 | Rinehart | 428/410 |
| 4,055,703 | 10/1977 | Rinehart | 428/410 |
| 4,057,184 | 11/1977 | Michalik | 225/2 |
| 4,119,760 | 10/1978 | Rinehart | 428/410 |
| 4,156,755 | 5/1979 | Rinehart | 428/410 |
| 4,420,362 | 12/1983 | Valimont et al. | 156/563 |
| 4,467,168 | 8/1984 | Morgan et al. | 65/105 |
| 4,600,653 | 7/1986 | Washita et al. | 428/425 |
| 4,656,791 | 4/1987 | Herrington et al. | 51/410 |
| 4,702,042 | 10/1987 | Herrington et al. | 51/321 |
| 4,711,056 | 12/1987 | Herrington et al. | 51/410 |

*Primary Examiner*—Arthur Kellogg
*Attorney, Agent, or Firm*—Donald Carl Lepiane

[57] ABSTRACT

A sectional curved article e.g. an automotive window is made by cutting a piece of glass, shaping the piece of glass, cutting the shaped piece to provide inner and outer segments. The edges of the segments are seamed, and the segments chemically tempered to provide a sectional curved automotive window having an opening in the outer segment to receive the inner segment.

43 Claims, 2 Drawing Sheets

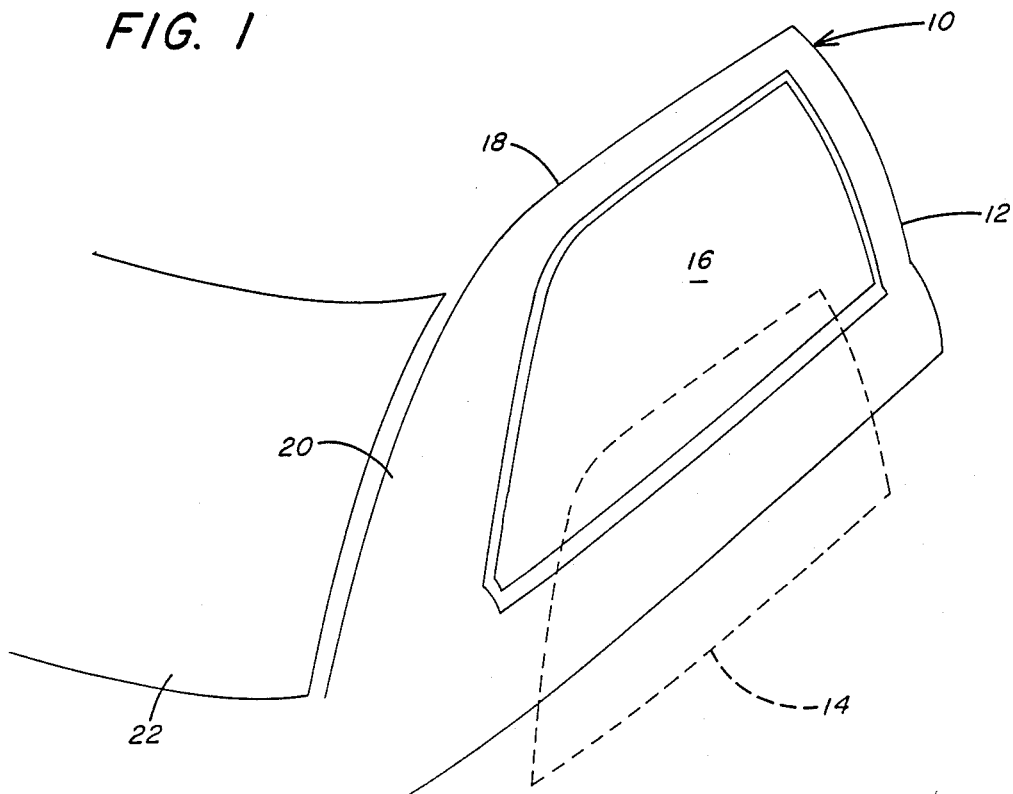

METHOD OF FABRICATING A CURVED GLASS PANEL HAVING A REMOVABLE SECTION AND GLASS PANEL WITH A REMOVABLE SECTION

CROSS-REFERENCE TO RELATED APPLICATION

This application is a continuation of application Ser. No. 173,383, filed March 25, 1988, which is a Continuation-in-part of application Ser. No. 000,225, filed Jan. 2, 1987, both now aboundoned.

BACKGROUND OF THE INVENTION

1. Field of the Invention

This invention relates to a method of faricating a shaped article having a removable section and, in particular, to a method of fabricating a sectional automotive window.

2. Discussion of the Technical Background

In general, sectional windows can be made using annealed glass by shaping, e.g. cutting or grinding, pieces of annealed glass to fit together to form the sectional window. The preceeding technique, however, is not acceptable where the windows are bent and/or tempered. By way of example, windows for vehicles are usually shaped monolithic glass pieces secured to the structural frame of the vehicle e.g. an automobile, or the monolithic glass pieces are mounted for movement, e.g., sidelites mounted for movement into and out of door cavities. The present technology is acceptable for manufacturing windows for today's automotive designs; however, such technology has limitation when used to fabricate future automotive window designs. More particularly, automotive sidelite designs are expected to include one shaped glass segment movable into an opening formed in another shaped glass segment.

The present technique for fabricating sectional sidelites includes cutting two glass segments to size, shaping the segments, and thereafter tempering the segments. The drawback of this technique is that each of the shaped segments will have reflective distortion resulting from the shaping. Furthermore, it is expected that there will be a curvature mismatch between the two shaped segments when the segments are moved together and reflective distortion at the edges of the segments. The reflective distortion is a result of anticlastical bending of the edges during shaping of the segments. The mismatch in curvature of the segments results from changes in the shape of the segments during tempering.

It would be advantageous to provide a technique for fabricating a sectional shaped glass article that does not have the drawback of the present available techniques.

SUMMARY OF THE INVENTION

The invention relates to a method of fabricating a sectional shaped glass window or enclosure. In the instance of forming a window for a vehicle e.g. an automobile, the method includes the steps of providing a piece having the shape of the automotive window. Thereafter, the piece is severed into at least two segments e.g., a minor or inner segment and a major or outer segment. In one embodiment, the outer segment has peripheral edge portions corresponding to peripheral edge portions of the shaped window and an opening. The inner segment when positioned in the opening of the outer segment provides a sectional shaped window having a contour with no significant localized change in the contour other than at the juncture of the segments.

The invention further relates to sectional shaped articles made practicing the invention.

DESCRIPTION OF THE DRAWINGS

FIG. 1 is a flow chart of significant process steps in the practice of the invention;

FIG. 2 is an isometric view of an automotive sidelite made by the practice of the instant invention;

GENERAL DESCRIPTION OF THE INVENTION

Figure 3:
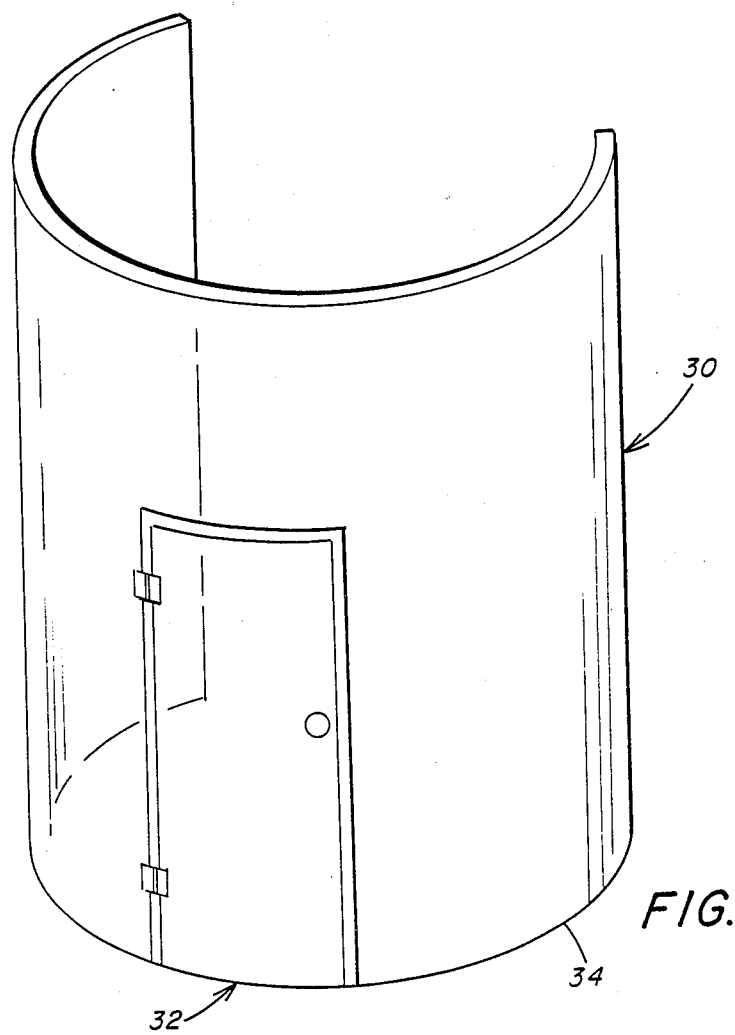
FIG. 3 is an elevated frontal view of an entry made by the practice of tha instant invention.

The invention will be taught to fabricate a vehicular window, more particularly an automotive sidelite; however, as will become apparent the practice of the invention is not limited thereto. For example, the invention may be practiced to make vision panels for residential or commercial buildings, or glass enclosures having a removable portion to provide access.

With reference to FIG. 1, in general, but not limiting to the invention, the preferred method of the invention includes the steps of cutting a sheet of glass to provide a piece of glass, shaping the glass piece, controllably cooling the glass piece, cutting the glass piece into at least two segments, seaming selected edges of the segments, and tempering the segments.

In more detail, a sheet of glass is cut to provide a piece of glass having at a minimum, peripheral dimensions sufficient to provide a shaped article having a predetermined shape and peripheral dimensions, e.g., automotive sidelite 10 shown in FIG. 2. During shaping of the piece the edges develop anticlastic curvature that causes reflective distortion at the edges. Although, not limiting to the invention, it is recommended that the glass piece have peripheral dimensions sufficient to provide an oversized shaped piece. In this manner, edge portions of the shaped piece having anticlastic curvature can be removed.

The cutting of the sheet is accomplished in any conventional manner, e.g., using a scoring wheel as taught in U.S. Pat. Nos. 3,537,345 and 4,057,184, applying heat as taught in U.S. Pat. Nos. 3,695,497 and 3,792,989, or using abrasive cutting jets as taught in the art. The teachings of the above-identified patents and techniques are hereby incorporated by reference.

Although not limiting to the invention, it is recommended that the edges of the piece be lightly seamed, in any conventional manner, to prevent injury during handling of the glass piece.

The glass piece is shaped in any convenient manner to the desired contour. For example, the piece may be shaped practicing the teachings taught in U.S. Pat. Nos. 3,573,022; 3,880,636; 3,992,181 and 4,052,188. The teachings of the above-identified patents are hereby incorporated by reference. In the instance when the peripheral dimensions of the shaped piece will be larger than the peripheral dimensions of the shaped article 10, the shaped article 10 is preferably centrally located within the shaped piece.

After shaping, the heated shaped glass piece is controllably cooled to anneal the shaped glass piece. Although not limited to the invention, it is recommended that the shaped glass piece be annealed because annealed glass is easier to sever than tempered glass. The glass can be annealed in any convenient manner, e.g., as taught in U.S. Pat. No. 3,301,650. The teachings of the patent are hereby incorporated by reference.

In the event the annealed shaped glass piece has peripheral dimensions greater than the desired shaped article, the piece is cut to size. The shaped glass piece may be cut in any convenient manner; however, because the glass is shaped, it is recommended that the cutting technique employed be capable of following the contour of the shaped glass piece. Cutting techniques recommended are laser cutting or abrasive jet cutting. After the shaped glass piece is cut to size, the piece is cut into segments, e.g., major or outer segment 12 and minor or inner segment 14 as shown in FIG. 2 and, if required, holes (not shown) cut into the segments for securing hardware to the segments. The hardware can be used to move the segments relative to one another, e.g., the inner segment 14 into cavity 16 of the outer segment 12. The holes (not shown) may be made in the segments in any convenient manner, e.g., as taught in U.S. Pat. No. 3,710,516, which teachings are hereby incorporated by reference.

After the segments are cut, it is recommended that the cut edges be seamed in any convenient manner, to reduce injury. Although not limited to the invention, the seaming may be performed during cutting by angling the abrasive jet to sever the piece while removing the sharp edges of the segments.

Segments used for sectional automotive sidelites are tempered to meet safety requirements. Although the shaped segments can be tempered in any convenient manner, it is recommended in the practice of the invention that the shaped segments be chemically tempered because thermal tempering requires heating the glass above 1100° F. (593° C.) which may alter the shape of the segments. When this occurs, the article formed by bringing the segments together will have a non-continuous contour, or a contour different than the predetermined contour resulting in a non-uniform reflective pattern.

Chemical tempering is practiced on ion-exchange glass having compositions similar to those taught in U.S. Pat. Nos. 4,053,679 and 4,156,755 which teachings are hereby incorporated by reference. The chemical tempering of the glass segments may be accomplished in any convenient manner, e.g., as taught in U.S. Pat. Nos. 3,287,200; 3,357,876; 4,055,703 and 4,119,760 which teachings are hereby incorporated by reference.

After tempering, the segments are dressed. For example, if the outer segment is to be secured to a car frame, a plastic molding may be fixed to the outer periphery of the outer segment; if the inner segment is to slide into and out of the hole in the outer segment, a track may be fixed in any convenient manner to inner surface of the outer segment, and a member riding in the track secured to the outer segment. Further portions of the segments may be coated in any convenient manner, e.g., using ceramic paste to provide designs or to hide hardware.

The process of the invention may be used to fabricate integral parts of the automotive window system, e.g., a contoured piece having the windshield portion in the center and a sidelite made pursuant to the instant invention at each end. In this instance, the windshield portion is not tempered but laminated in any convenient manner, e.g., as taught in U.S. Pat. Nos. 3,453,161; 4,046,951 and 4,420,362 or an antilacerative layer applied to the windshield portion in any convenient manner, e.g., as taught in U.S. Pat. Nos. 3,900,673 and 4,600,653, which teachings are hereby incorporated by reference. A ceramic paste or paint may be applied to hide the automotive structure or provide a visible separation between the windshield portion and sidelite portions. The integral part may include a rear window portion with sidelite portions on each end. The rear window portion would be chemically tempered and thereafter heating lines may be applied to the rear window portion in any convenient manner, e.g., as taught in U.S. Pat. No. 3,721,594, which teachings are hereby incorporated by reference.

As can now be appreciated, windows for any type of vehicle e.g., space, air, land or water can be made practicing the teachings of the instant invention. Further, the invention may be practiced to make laminated articles. For example, the pieces of glass to be laminated are shaped in any conventional manner e.g., as taught in U.S. Pat. No. 4,265,650 which teachings are hereby incorporated by reference. Thereafter, each shaped piece is cut into two segments e.g., the inner and outer segments as previously discussed. The inner segments, and the outer segments, of each piece are laminated together. The laminated inner and outer segments may be dressed as previously discussed. In the alternative, after the shaped pieces are cut into the segments, the segments of each piece may be tempered as previously discussed before they are laminated together.

Figure 4:
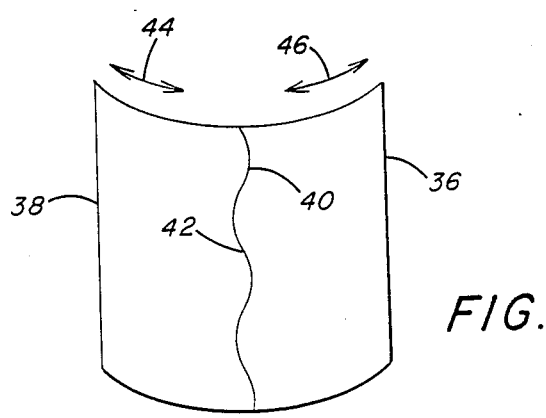
FIG. 4 is an elevated frontal view of segments having interfitting edges.

The invention may also be practiced to provide shaped entry way for buildings. More particular and with reference to FIG. 3, shaped glass entry 30 has a door 32 e.g. inner segment. The glass entry is shaped, and the door 32 cut from the piece as previously discussed. The door 32 and outer wall 34 may be tempered and dressed as previously discussed. The segments, for example segments 36 and 38 shown in FIG. 4 may have scalloped contact edges 40 and 42 that are interdigitate. The segments may move relative to one another as shown by arrows 44 and 46.

DETAILED DESCRIPTION OF THE INVENTION

With reference to FIG. 2, the invention is practiced to make an automotive sidelite 10. The sidelite 10 has a curved portion 18 at the top as viewed in FIG. 2 to form a part of the automotive roof, and a curved portion 20 at the left side as viewed in FIG. 2 to form part of the viewing area that meets the windshield 22. A sheet of ion-exchange glass is severed using a scoring wheel to provide a glass piece having peripheral dimensions sufficient to provide a shaped piece having about three (3) inches (8.12 centimeters) of trim. The edges of the glass piece were lightly seamed to make the piece safe for subsequent handling.

The glass piece was shaped by supporting the glass piece by tongs as it moved through a heating furnace to heat the glass. Thereafter, the heated glass piece was shaped between a male and female mold mounted for movement toward and away from each other along a horizontal path. After shaping the piece was held between the molds and controllably cooled so as not to thermally temper the shaped glass piece. Thereafter, the shaped glass piece was further annealed in a heating facility.

An abrasive water jet, Model No. 151 sold by Flow Systems, Inc., of Kent, Washington, was used to remove the trim to provide a shaped piece of glass having the desired peripheral dimension and configuration of the automotive sidelite. Thereafter, inner segment 14 similar to that shown in FIG. 2 was cut out of the piece 10 to provide the inner and outer segments 14 and 12, respectively. The edges of the inner segment 14 were beveled using the abrasive water jet. The edges of the outer segment 12 were hand seamed. Thereafter, the inner and outer segments were chemically tempered by submerging the segments in a salt bath of sodium nitrate heated to a temperature of 700° F. for 24 hours.

As can now be appreciated, the above detailed description is not limiting to the invention. For example, the inner segment 14 may slide into a groove formed in the outer segment 12.

What is claimed is:

1. A method of fabricating a sectional curved panel of a predetermined shape for a vehicle, the panel having a removable segment comprising the steps of:
   providing a piece of glass;
   shaping the glass piece to provide a curved piece having a curvature similar to the predetermined shape of the vehicular panel;
   severing the piece into at least two segments defined as a major segment and a minor segment, the minor segment fitting within the major segment; and
   tempering the minor and major segments to preserve the pre-tempering shape of the segments to provide the sectional curved vehicular panel having the minor segment removable from the major segment.

2. The method as set forth in claim 1 wherein said providing step includes the step of severing the piece from a sheet of glass, the piece having peripheral dimensions sufficient to provide the curved piece with outer dimensions similar to the outer dimensions of the sectional curved vehicular panel.

3. The method as set forth in claim 2 further including the step of seaming the edges of the piece.

4. The method as set forth in claim 1 wherein shaping the includes the steps of:
   heating the piece to a shaping temperature;
   shaping the piece; and
   heat treating the curved piece.

5. The method as set forth in claim 4 wherein performing said heat treating step anneals the curved piece.

6. The method as set forth in claim 1 wherein said severing step includes the step of abrasive cutting the curved piece to cut the curved piece to provide the two segments.

7. The method as set forth in claim 1 wherein said step of tempering the segments is accomplished by chemically tempering the segments.

8. The method as set forth in claim 7 wherein the vehicle is a vehicle used on land.

9. The method as set forth in claim 1 wherein the vehicle is an automobile and the sectional curved panel is an automotive sectional curved panel.

10. The method as set forth in claim 9 wherein the sectional curved panel includes a sidelite portion and a windshield portion.

11. The method as set forth in claim 9 wherein the sectional curved panel includes a sidelite portion and a rear window portion.

12. The method as set forth in claim 9 wherein the minor segment is an inner segment and the major segment is an outer segment and said severing step includes severing the curved piece to provide the major segment with a hole or groove and portion removed from the hole or groove is the minor segment.

13. The method as set forth in claim 12 further including the step of seaming the minor and major segments after said severing step.

14. The method as set forth in claim 2 wherein said severing step is a second severing step and said providing step includes a first severing step to sever the piece of glass from a sheet of glass to provide the piece with peripheral dimensions sufficient to provide a curved piece having outer dimensions greater than the outer dimensions of the vehicular sectional curved panel, and a third severing step practiced after said shaping step to remove excess peripheral edge portions from the first or second segments or from the curved piece.

15. The method as set forth in claim 14 further including the step of dressing the segments.

16. The method as set forth in claim 1 wherein the vehicle is used in space.

17. The method as set forth in claim 1 wherein the vehicle is used for air travel.

18. The method as set forth in claim 1 wherein the vehicle is on or under water.

19. A method of fabricating a sectional curved panel of a predetermined shape for a vehicle, the panel having two segments, each segment having a contact edge with the contact edge of one segment in close proximity to the contact edge of the other segment to define a separation line, comprising the steps of:
   providing a piece of glass;
   shaping the piece of glass to define a common curved piece of glass;
   severing the common curved piece of glass to provide the two segments; and
   tempering the segments to preserve the pre-tempering shape of the segments to provide the sectional curved panel having no significant localized change in curvature from the shaped piece of glass other than at the separation line.

20. A sectional curved panel for a vehicle having a major segment and a minor segment severed from a common curved glass piece, the segments tempered to preserve the pre-tempered shape of the segments with the minor tempered segment fitting within the major tempered segment.

21. The panel as set forth in claim 20 wherein the vehicle is an automobile and the panel is an automotive panel.

22. The panel as set forth in claim 21 wherein the sectional panel includes a windshield section and at least one sidelite section.

23. The panel as set forth in claim 21 wherein the sectional panel includes a rear window section and at least one sidelite section.

24. The panel as set forth in claim 21 wherein the sectional panel is a sidelite and the segments are chemically tempered.

25. The panel as set forth in claim 21 wherein the segments assembled together provide the sectional curved panel that has no significant localized change in curvature other than at the juncture between the segments.

26. A method of fabricating a sectional curved glass article, the article having a removable segment comprising the steps of:
   providing a piece of glass;
   shaping the glass piece to provide a curved piece having a curvature similar to the curvature of the sectional curved glass article; and severing the piece into at least two segments defined as a major segment and a minor segment, the minor segment fitting within the major segment.

27. The method as set forth in claim 26 further including the step of tempering the minor and major segments to preserve the pre-tempering shape of the segments to provide the sectional curved glass article having the minor segment removable from the major segment.

28. The method as set forth in claim 26 wherein the article is a vision panel for a building.

29. The method as set forth in claim 26 wherein the article is an entry for a building and the minor segment is a door.

30. The method as set forth in claim 26 wherein the article is a glass booth and the minor segment covers an access opening to the booth.

31. The method as set forth in claim 26 wherein said providing step includes the step of severing the piece from a sheet of glass, the piece having peripheral dimensions sufficient to provide the curved piece with outer dimensions similar to the outer dimensions of the curved automotive panel.

32. The method as set forth in claim 26 wherein shaping the piece includes the steps of:
heating the piece to a shaping temperature;
shaping the piece; and
heat treating the curved piece.

33. The method as set forth in claim 32 wherein performing said heat treating step anneals the curved piece.

34. The method as set forth in claim 26 wherein said severing step includes the step of abrasive cutting the curved piece to cut the curved piece to provide the two segments.

35. The method as set forth in claim 26 wherein said step of tempering the segments is accomplished by chemically tempering the segments.

36. The method as set forth in claim 26 wherein the minor segment is an inner segment and the major segment is an outer segment surrounding the inner segment and said severing step includes severing the cured piece to provide the major segment with a hole and portion removed from the hole is the minor segment.

37. A method of fabricating a sectional curved article having two segments, each segment having a contact edge with the contact edge of one segment in close proximity to the contact edge of the other segment to define a separation line, comprising the steps of:
providing a piece of glass;
shaping the piece of glass to define a common curved piece of glass;
severing the common curved piece of glass to provide the two segments; and
tempering the segments to preserve the pre-tempering shape of the segments to provide the sectional curved article having no significant localized change in curvature from the shaped piece of glass other than at the separation line.

38. A sectional glass article having a major segment and a minor segment severed from a common curved glass piece, the segments tempered to preserve the pre-tempered shape of the segments with the minor tempered segment fitting within the major tempered segment.

39. The article as set forth in claim 38 wherein the article is an entry for a building and the minor segment is a door.

40. The article as set forth in claim 38 wherein the segments are chemically tempered.

41. The article as set forth in claim 38 wherein the segments assembled together provide the article having no significant localized change in curvature other than at the juncture between the segments.

42. The method as set forth in claim 1 wherein the panel includes the roof of the vehicle.

43. The method as set forth in claim 19 wherein one of the segments includes the roof of the vehicle.

* * * * *

UNITED STATES PATENT AND TRADEMARK OFFICE
CERTIFICATE OF CORRECTION

PATENT NO.  : 4,865,919

DATED       : September 12, 1989

INVENTOR(S) : Robert G. Frank and Kathleen L. Moyer

It is certified that error appears in the above-identified patent and that said Letters Patent is hereby corrected as shown below:

Column 5, claim 4, line 2, after first occurrence of "the" insert --piece--.

Signed and Sealed this

Sixteenth Day of October, 1990

Attest:

HARRY F. MANBECK, JR.

*Attesting Officer*    *Commissioner of Patents and Trademarks*